(12) United States Patent
Seward

(10) Patent No.: US 7,224,521 B2
(45) Date of Patent: May 29, 2007

(54) PARCENTRIC OBJECTIVE

(75) Inventor: George H. Seward, Arlington, MA (US)

(73) Assignee: Cytyc Corporation, Marlborough, MA (US)

( * ) Notice: Subject to any disclaimer, the term of this patent is extended or adjusted under 35 U.S.C. 154(b) by 44 days.

(21) Appl. No.: 10/940,063

(22) Filed: Sep. 13, 2004

(65) Prior Publication Data

US 2006/0056014 A1    Mar. 16, 2006

(51) Int. Cl.
*G02B 21/02* (2006.01)
*G02B 26/08* (2006.01)

(52) U.S. Cl. .................. 359/368; 359/211; 359/210

(58) Field of Classification Search ............ 359/211, 359/656–661, 831, 837; 369/112.28
See application file for complete search history.

(56) References Cited

U.S. PATENT DOCUMENTS

| | | | | |
|---|---|---|---|---|
| 4,118,109 A | * | 10/1978 | Crawford et al. ........... | 359/196 |
| 4,265,534 A | * | 5/1981 | Remijan ...................... | 356/2 |
| 4,279,507 A | * | 7/1981 | Bulpitt ........................ | 356/225 |
| 4,289,374 A | * | 9/1981 | Franken et al. .............. | 385/85 |
| 4,364,628 A | | 12/1982 | Garner et al. | |
| 4,502,751 A | * | 3/1985 | Fjeldsted et al. ............ | 359/211 |
| 4,927,250 A | * | 5/1990 | Suda .......................... | 359/557 |
| 5,461,513 A | * | 10/1995 | Maruyama .................. | 359/837 |
| 5,880,465 A | * | 3/1999 | Boettner et al. ............ | 250/234 |
| 6,320,699 B1 | * | 11/2001 | Maeda et al. ................ | 359/637 |
| 6,377,536 B1 | * | 4/2002 | Kim et al. .............. | 369/112.17 |
| 6,555,802 B2 | * | 4/2003 | Osipchuk et al. ........ | 250/201.3 |
| 2001/0048082 A1 | | 12/2001 | Yuri et al. | |

FOREIGN PATENT DOCUMENTS

| | | |
|---|---|---|
| DE | 20316784 | 1/2004 |
| GB | 1219172 | 1/1971 |
| GB | 2174862 | 11/1986 |

OTHER PUBLICATIONS

PCT International Search Report for PCT/US2005/030124, Applicant: Cytyc Corporation., Forms PCT/ISA/220 & PCT/USA/210, dated Nov. 30, 2005 (7 pages).
PCT Written Opinion for PCT/US2005/030124, Applicant: Cytyc Corporation, Forms PCT/ISA/237, dated Nov. 30, 2005 (5 pages).

* cited by examiner

*Primary Examiner*—Mark A. Robinson
(74) *Attorney, Agent, or Firm*—Vista IP Law Group LLP

(57) ABSTRACT

A parcentric objective is described, including an objective lens configured to receive an incident ray from a field of view and to translate the incident ray into a translated incident ray, the objective lens substantially aligned across an optical axis, and a wedge prism configured to receive and deflect the translated incident ray into an exiting ray, the wedge prism rotated about the optical axis. A specimen review system is also described, including a specimen stage configured to receive specimens for viewing, a source of illumination providing illumination to the specimen stage, a review scope configured to review specimens positioned on the specimen stage, the review scope comprising a parcentric objective configured to resolve a field of view of the specimen stage.

20 Claims, 2 Drawing Sheets

PARCENTRIC OBJECTIVE

FIELD OF THE INVENTION

The present invention relates generally to microscopy. More specifically, a parcentric objective and its use are disclosed.

BACKGROUND OF THE INVENTION

Maintaining a specimen within a field of view when switching or translating objectives may be affected by the degree of parcentricity. A specimen may shift from a field of view when, for example, objective lenses are translated across their optical axes. Switching or translating objective lenses can create deviations resulting in a specimen being lost from a field of view when, for example, a greater magnification objective is selected and translated. Objective lenses may be switched manually or automatically and are often translated along a single degree of freedom, such as along a straight line or an arc. Subsequently, maintaining parcentricity while translating objectives is problematic.

Conventional objectives have several problems with regard to parcentricity. For example, translating an objective to a higher power magnification objective typically shifts the center of the field of view. Such shifts can also cause users to incur significant time and effort attempting to fix and align an objective after translation. Current methods of correction for parcentricity during manufacturing require specially-trained technicians. Furthermore, the parcentricity error can grow due to mechanical wear—restoration of parcentricity requires service by technicians. Conventional objectives typically provide for only a single degree of freedom during operation, rendering correction of parcentricity errors impossible during operation. Alignment methods for parcentricity are available during manufacture, but they are not appropriate during operation. These alignment methods employ translation of an objective across its optical axis. These parcentricity methods are typically not performed by an operator of the microscope. Alignment of parcentricity requires considerable effort by a specially-trained technician.

Conventional methods for beam steering can be applied to the exiting light of an objective to achieve parcentricity but these existing methods are impractical. Specifically, a pair of Risley prisms can establish parcentricity, but this alignment method would not be appropriate for an ordinary operator. A Risley prism is a wedge of glass with a freedom of rotation about a normal to one of the faces of the prism. Alignment of Risley prisms also require a specially-trained technician. A pair of Risley prisms are impractical when applied to parcentricity of microscope objectives.

A pair of Risley prisms is often used to provide two degrees of freedom in beam steering applications. Risley prisms deflect rays in a range of deflection that is typically less than 5°. However, Risley prisms cannot be used to achieve a net deflection of zero due to finite differences between the wedge angles of the prisms. The finite difference between wedge angles creates a small circle of exclusion, resulting in a range of deflection in the shape of an annulus. This circle of exclusion is problematic in application to parcentricity. Further, when used with converging rays, Risley prisms create aberrations in the form of astigmatisms that are dependent upon the variable orientation of the prisms. When used with parallel rays of different colors conventional Risley prisms create aberrations known as lateral color.

BRIEF DESCRIPTION OF THE DRAWINGS

Various embodiments of the invention are disclosed in the accompanying drawings, and described in the following detailed description.

DETAILED DESCRIPTION

The invention can be implemented in numerous ways, including as an apparatus, a process, and a system. In this specification, these implementations, or any other form that the invention may take, may be referred to as techniques. In general, the order of the steps of disclosed processes may be altered within the scope of the invention.

A detailed description of one or more embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
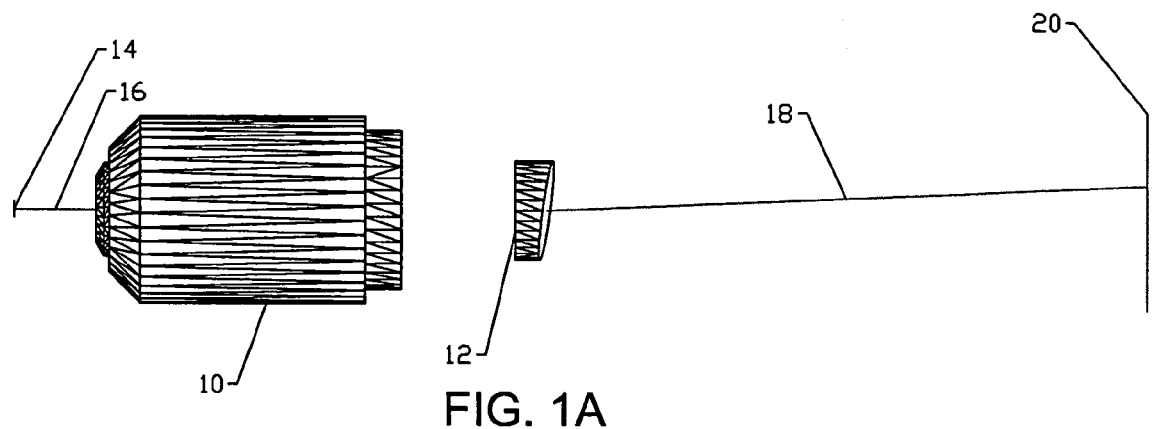
FIG. 1A illustrates an exemplary side view of a parcentric objective.

FIG. 1A illustrates an exemplary side view of a parcentric objective. Here, several components are shown. Objective lens 10, wedge prism 12, field of view (of a specimen) 14, incident ray 16, exiting ray 18, and distant aperture 20 are shown in this example. In other examples, more components than those shown may be used to implement a parcentric objective. The components are aligned along an optical axis, which is also coincident with a radial propagation vector of incident ray 16. Objective lens 10 may be implemented to resolve field of view 14 using a variety of techniques and lenses (e.g., PLAN, PLAN achromat, PLAN apochromat). However, an infinity-corrective objective may also be used for improving performance. Exiting ray 18 is deflected from wedge prism 12, in some examples, using a translated incident ray (not shown) between objective lens 10 and wedge prism 12. In some examples, characteristics of exiting ray 18 may be affected by objective lens 10 and wedge prism 12, including altering the degree of deflection from wedge prism 18. Exiting ray 18 is deflected from wedge prism 12 using incident ray 16 and the optical axis of the parcentric objective. However, in other embodiments, incident ray 16 and exiting ray 18 may be aligned using a range of deflection, as described below in connection with FIG. 2.

In the configuration shown in FIG. 1A, wedge prism 12 may be placed within an infinity-corrected zone of objective lens 10. In other examples, wedge prism 12 may be placed differently (e.g., asymmetrically aligned with an optical axis). A specimen may be illuminated within field of view 14, from which light rays may be directed similar to incident ray 16 into objective lens 10. Incident ray 16 passes through objective lens 10 creating an infinitely-distanced image of field of view 14. Exiting ray 18 enters distant aperture 20, where its spatial position corresponds with its angular direction. Another lens, such as a tube lens (not shown) converts the angular direction of the exiting ray 18 into a spatial position within a nearby image (not shown) of field of view 14. The nearby image of field of view 14 may be viewed by an observer through an ocular lens (not shown), or the nearby image of field of view 14 may be located on an image sensor (not shown) such as film or a CCD camera.

Figure 1B:
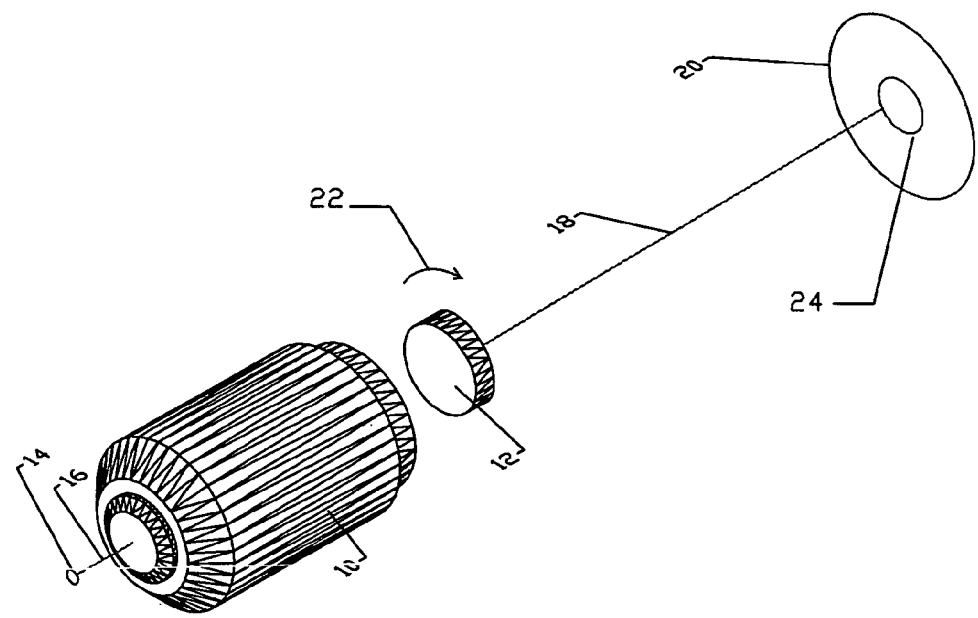
FIG. 1B illustrates an exemplary isometric view of a parcentric objective with rotation of wedge prism.

FIG. 1B illustrates an exemplary isometric view of a parcentric objective with rotation of wedge prism 12. After passing through objective lens 10, incident ray 16 is deflected by wedge prism 12, which shifts exiting ray 18 within distant aperture 20. Rotation 22 of wedge prism 12 directs exiting ray 18 along the perimeter of circle of deflection 24 within distant aperture 20. Rotation 22 of wedge prism 12, provides a first degree of freedom along the circumference of circle of deflection 24.

Figure 2:
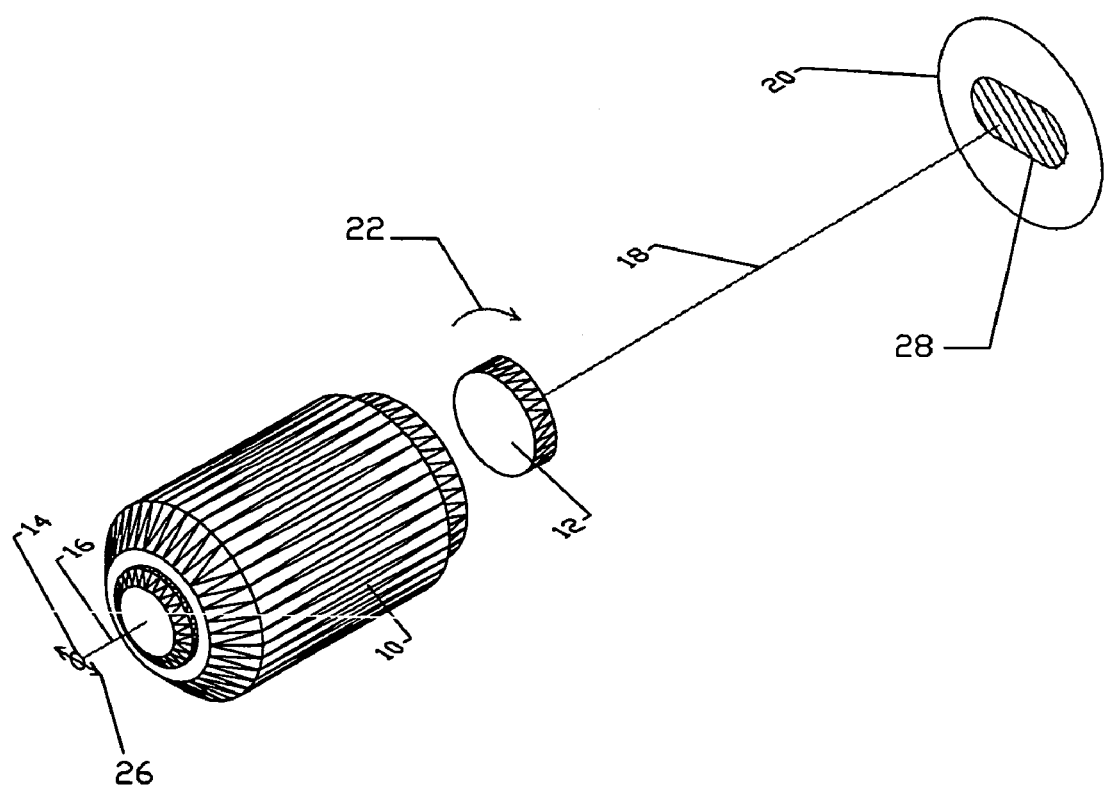
FIG. 2 illustrates an exemplary isometric view of a parcentric objective with rotation of wedge prism and translation of objective lens.

FIG. 2 illustrates an exemplary isometric view of a parcentric objective with rotation of wedge prism 12 and translation of objective lens 10. In this example, circle of deflection 24 (not shown) may be translated along distant aperture 20 across range of translation 26. Translation of objective lens 10 provides a second degree of freedom. If translation of objective lens 10 exceeds the diameter of circle of deflection 24 (not shown), then a continuous range of deflection 28 is created. Thus, exiting ray 18 may be deflected in a direction that corresponds to the direction of another exiting ray of a different (e.g., previous, lower power, translated, etc.) objective. In this embodiment, exiting ray 18 from objective lens 10 may be directed to distant aperture 20 within two degrees of freedom. Subsequently, range of deflection 28 is achieved in which a net deflection of zero is possible. In this example illustrated, rotation 22 is depicted in a clockwise direction. In other examples, rotation 22 may be in a direction other than clockwise.

Objective lens 10 may be translated across range of translation 26. Range of translation 26 provides a range of incident rays as objective lens 10 is translated or switched. By translating objective lens 10, exiting ray 18 may be directed in a curvilinear path. In contrast, when wedge prism 12 is rotated in a direction (e.g., 22), exiting ray 18 may be directed along circle of deflection 24, depending upon the degree of rotation 22. When combined, range of translation 26 and rotation 22 produce range of deflection 28, which is a convolution of a curvilinear path and a circle. Thus, exiting ray 18 may be directed against distant aperture 20 within range of deflection 28, without an area of exclusion. In this example, range of deflection 28 may be constructed by directing exiting ray 18 within two degrees of freedom. Although rotation 22 is illustrated in a clockwise direction in this example, movement of wedge prism 12 may occur in directions other than those illustrated. Similarly, range of translation 26 may also be different than shown in the above example. Range of deflection 28 is a continuous area and may be achieved without aberrations. Additionally, range of deflection 28 does not display a circle of exclusion about zero translation as a pair of Risley prisms does.

With regard to aberrations, different materials may be used to implement wedge prism 12 to avoid lateral color. As an example, a dependency of deflection represents a property of wedge prism 12 that affects the creation of a consistent angular deflection of exiting ray 18. Materials used to implement wedge prism 12 may affect the dependency of deflection, which may also be affected by the wavelength of exiting ray 18. Chromatic aberrations may be avoided by using a monochromatic infinity-corrected objective with wedge prism 12. The use of a monochromatic infinity-corrected objective lens is not affected by the planar geometry of the active surface of wedge prism 12. Wedge prism 12 creates a consistent angular deflection of exiting ray 18, while the radial position may shift without consequence to the image quality of the specimen directed at distant aperture 20. Thus, a range of deflection 28 may be achieved without incurring a chromatic aberration.

In a polychromatic system, chromatic aberrations may be eliminated using an achromatic wedge which employs two or more glass types, for deflecting light rays at different wavelengths. Although prisms disperse light of different wavelengths across a range of angles, elimination or minimization of chromatic aberrations of this type may be achieved with an achromatic prism. Using an achromatic prism as the wedge prism 12 with objective lens 10 enables a net deflection of zero in range of deflection 28 without chromatic aberrations in a polychromatic system. Regardless of the type of system used to correct chromatic aberrations, parcentric objectives such as those described above may be used.

Imaging, specimen review, specimen marking, specimen analysis, and other cytological systems may be used with various embodiments of the above techniques. For example, objectives found in imaging systems may be replaced with parcentric objectives such as those described above. Automatic and manual imaging or specimen review systems enable the review, marking, and analysis of specimens. In some examples, a parcentric objective may be implemented with a specimen review, analysis, marking, or other system to ensure that a field of view of a specimen, for example, is maintained. Parcentric objectives may also be used with systems such as those described in U.S. Published patent application Ser. No. 10/008,379 to Maenle et al. (filed Nov. 5, 2001, published Sep. 25, 2003), which is incorporated by reference in its entirety. Other types of systems having components such as review scopes, specimen modules for viewing one or more specimens (e.g., a deck of prepared specimen samples for viewing in an imaging system), optical instruments, objectives, or other types of lenses may also be used to implement the above techniques. As an example, optical instruments having objective lenses may be implemented using a parcentric objective in accordance with the techniques described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A biological specimen review device, comprising:
   an illumination source configured to illuminate the biological specimen;
   a translatable objective lens configured to receive an incident ray from a field of view of the biological specimen and to translate the incident ray into a translated incident ray, the objective lens substantially aligned across an optical axis and being translatable in a direction substantially perpendicular to the optical axis; and
   a wedge prism configured to receive and deflect the translated incident ray into an exiting ray directed against an aperture, the wedge prism being rotatable about the optical axis, and wherein the objective lens is translatable relative to the wedge prism such that the exiting ray has a range of deflection without an area of exclusion.

2. The biological specimen review device of claim 1, wherein a characteristic of the exiting ray is controlled by the wedge prism.

3. The biological specimen review device of claim 2, wherein the characteristic is a direction.

4. The biological specimen review device of claim 2, wherein the characteristic is an angle of deflection.

5. The biological specimen review device of claim 2, wherein the characteristic is a range of deflection.

6. The biological specimen review device of claim 2, wherein the characteristic is a degree of freedom.

7. The biological specimen review device of claim 2, wherein the characteristic is a chromatic aberration.

8. The biological specimen review device of claim 1, wherein a characteristic of the exiting ray is controlled by the objective lens.

9. The biological specimen review device of claim 8, wherein the characteristic is a direction.

10. The biological specimen review device of claim 8, wherein the characteristic is an angle of deflection.

11. The biological specimen review device of claim 8, wherein the characteristic is a range of deflection.

12. The biological specimen review device of claim 8, wherein the characteristic is a degree of freedom.

13. The biological specimen review device of claim 1, wherein a characteristic of the exiting ray is controlled by rotation of the wedge prism relative to the optical axis.

14. The biological specimen review device of claim 1, wherein a material of the wedge prism determines a dependency of deflection upon a wavelength of the exiting ray.

15. The biological specimen review device of claim 1, wherein the exiting ray is deflected in a continuous region having a first degree of freedom associated with translation of the objective lens across the optical axis.

16. The biological specimen review device of claim 1, wherein the exiting ray is deflected in a continuous region having a first degree of freedom associated with translation of the objective lens across the optical axis and a second degree of freedom associated with rotation of the wedge prism about the optical axis.

17. The biological specimen review device of claim 1, wherein the exiting ray is substantially parallel to the incident ray.

18. The biological specimen review device of claim 1, wherein the exiting ray is deflected in a range of deflection relative to the optical axis, the range of deflection comprising a convolution of a circle generated by rotation of the wedge prism about the optical axis and a curvilinear path generated by translation of the objective lens across the optical axis.

19. A method for viewing a biological specimen, comprising:
receiving an incident ray from a field of view of the biological specimen;
translating the incident ray into a translated incident ray using a translatable objective lens that is translatable in a direction substantially perpendicular to the optical axis;
deflecting the translated incident ray with a rotatable wedge prism into an exiting ray directed against an aperture such that the exiting ray has a range of deflection without an area of exclusion.

20. The method of claim 19, further comprising
controlling a range of deflection of the exiting ray using the wedge prism.

* * * * *